(12) United States Patent
Ahn et al.

(10) Patent No.: US 10,728,499 B2
(45) Date of Patent: Jul. 28, 2020

(54) ELECTRONIC APPARATUS AND COMMUNICATION METHOD THEREOF

(71) Applicant: HYPERCONNECT INC., Seoul (KR)

(72) Inventors: Sang Il Ahn, Chungcheongbuk-do (KR); Hyeok Choi, Seoul (KR)

(73) Assignee: HYPERCONNECT INC., Seoul (KR)

( * ) Notice: Subject to any disclaimer, the term of this patent is extended or adjusted under 35 U.S.C. 154(b) by 0 days.

(21) Appl. No.: 16/178,477

(22) Filed: Nov. 1, 2018

(65) Prior Publication Data
US 2019/0132550 A1    May 2, 2019

(30) Foreign Application Priority Data

Nov. 2, 2017  (KR) ..................... 10-2017-0145497

(51) Int. Cl.
*H04N 7/14*    (2006.01)
*G06F 3/0484*  (2013.01)
(Continued)

(52) U.S. Cl.
CPC ......... *H04N 7/147* (2013.01); *G06F 3/04845* (2013.01); *H04L 67/306* (2013.01); *H04N 5/265* (2013.01); *H04N 5/2621* (2013.01); *G06F 3/04842* (2013.01); *G06T 7/194* (2017.01); *G06T 2207/20021* (2013.01); *G06T 2207/30201* (2013.01)

(58) Field of Classification Search
CPC ............ G06F 3/04842; G06F 3/04845; G06T 2207/20021; G06T 2207/30201; G06T 7/194; H04L 67/306; H04N 5/2621; H04N 5/265; H04N 7/147

USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/414.1, 566; 704/270

See application file for complete search history.

(56) References Cited

U.S. PATENT DOCUMENTS 7,564,476 B1 *  7/2009  Coughlan .............. H04N 7/147
                                              348/14.01
2003/0058939 A1  3/2003  Lee et al.
(Continued)

FOREIGN PATENT DOCUMENTS

CN    1411277 A       4/2003
JP    2003-219383 A   7/2003
(Continued)

OTHER PUBLICATIONS

First Office Action for corresponding Korean Patent Application No. 10-2017-0145497, dated Jun. 25, 2019.
(Continued)

*Primary Examiner* — Khai N. Nguyen
(74) *Attorney, Agent, or Firm* — Merchant & Gould P.C.

(57) ABSTRACT

An electronic apparatus making a video call includes a processor dividing an image of a user of the electronic apparatus into a plurality of areas and editing an area, which is not selected from the user, from among the plurality of areas to generate the edited image, an input device receiving a selection input to select at least one area among the plurality of areas from the user, and a communication device transmitting the edited image to an electronic apparatus of a video call counterpart.

20 Claims, 11 Drawing Sheets

(51) Int. Cl.
*H04N 5/265* (2006.01)
*H04L 29/08* (2006.01)
*H04N 5/262* (2006.01)
*G06T 7/194* (2017.01)

(56) References Cited

U.S. PATENT DOCUMENTS

| | | | |
|---|---|---|---|
| 2004/0257431 A1* | 12/2004 | Girish | H04N 5/232 348/14.01 |
| 2005/0083399 A1 | 4/2005 | Shinkai | |
| 2007/0216675 A1* | 9/2007 | Sun | G06T 11/00 345/419 |
| 2010/0118109 A1 | 5/2010 | Sakai et al. | |
| 2010/0189355 A1* | 7/2010 | Tanaka | G06T 11/60 382/190 |
| 2011/0300931 A1* | 12/2011 | Kitahara | A63F 13/42 463/30 |
| 2013/0312041 A1 | 11/2013 | Gresta | |
| 2014/0362163 A1* | 12/2014 | Winterstein | H04N 7/15 348/14.07 |
| 2017/0235975 A1 | 8/2017 | Iwanami et al. | |
| 2019/0132550 A1* | 5/2019 | Ahn, II | H04N 7/147 |

FOREIGN PATENT DOCUMENTS

| | | |
|---|---|---|
| JP | 2005-124161 A | 5/2005 |
| JP | 2005-322969 A | 11/2005 |
| JP | 2006-050370 A | 2/2006 |
| JP | 2006-270380 A | 10/2006 |
| JP | 2015-525496 A | 9/2015 |
| JP | WO2016/072118 A1 | 8/2017 |
| KR | 10-2004-0046906 A | 6/2004 |
| KR | 10-2008-0044379 A | 5/2008 |
| KR | 10-2009-0093528 A | 9/2009 |
| KR | 10-2011-0045942 A | 5/2011 |
| KR | 10-1172268 B1 | 8/2012 |
| KR | 10-2013-0101823 A | 9/2013 |

OTHER PUBLICATIONS

Extended European Search Report from European Application No. 18203915.6, dated Mar. 7, 2019.

First Office Action issued in corresponding Japanese Application No. 2018-207367, dated Sep. 19, 2019.

* cited by examiner

ELECTRONIC APPARATUS AND COMMUNICATION METHOD THEREOF

CROSS-REFERENCE TO RELATED APPLICATION

This application is claims the benefit of priority to Korean Patent Application No. 10-2017-0145497, filed in the Korean Intellectual Property Office on Nov. 2, 2017, the entire contents of which are incorporated herein by reference.

TECHNICAL FIELD

The present disclosure relates to an electronic apparatus and a communication method thereof.

BACKGROUND

There is a video call function that allows users to talk to each other while the users look at each other's images rather than a call using only a voice, among functions provided for user convenience in a mobile communication terminal. The video call is made by simultaneously transmitting voice data input through a microphone and image data input through a camera. That is, a user may capture a face image in real time by using the camera mounted in the mobile communication terminal. The mobile communication terminal transmits the captured face image to a mobile communication terminal of a counterpart in the call connection state, and displays an image received from the mobile communication terminal of the counterpart on a screen, and thus may make a call while users look at each other's faces.

However, there may be a situation where a user does not want to expose his/her image to the counterpart because of the surrounding environment and the personal identity of the user, when the user makes a video call by using the mobility of the mobile communication terminal. This situation may lead to the privacy breach of the user and may cause the discomfort to the counterpart.

SUMMARY

The present disclosure has been made to solve the above-mentioned problems occurring in the prior art while advantages achieved by the prior art are maintained intact.

An aspect of the present disclosure provides an electronic apparatus and a communication method thereof that are capable of performing a video call function with the enhanced function to protect a user's privacy.

An aspect of the present disclosure provides an electronic apparatus and a communication method thereof that are capable of performing a video call function with the improved convenience of the user.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an electronic apparatus making a video call may include a processor dividing an image of a user of the electronic apparatus into a plurality of areas and editing an area, which is not selected from the user, from among the plurality of areas to generate the edited image, an input device receiving a selection input to select at least one area among the plurality of areas from the user, and a communication device transmitting the edited image to an electronic apparatus of a video call counterpart.

According to an embodiment, the processor may be configured to divide the image of the user of the electronic apparatus into a plurality of areas by using profile information of the video call counterpart.

According to an embodiment, the profile information may include reputation or blocking history of the video call counterpart.

According to an embodiment, the processor may be configured to divide the image of the user into a plurality of areas of the smaller number, as the reputation of the video call counterpart is higher.

According to an embodiment, the processor may be configured to divide the image of the user into a plurality of areas by using default setting information of the user.

According to an embodiment, the default setting information of the user may include selection information about a predetermined area among the plurality of areas.

According to an embodiment, the plurality of areas may include a face area, a body area, and a background area.

According to an embodiment, the processor may be configured to generate the edited image by displaying an area, which is not selected from the user, from among the plurality of areas with an alternative image or by distorting the area.

According to an embodiment, the processor may be configured to adjust a degree of distortion of the area, which is not selected from the user, depending on an intimacy with the video call counterpart.

According to an embodiment, the intimacy may increase as call duration with the video call counterpart is longer or the amount of conversation is greater, and the processor may decrease the degree of distortion of the area, which is not selected from the user, as the intimacy increases.

According to an embodiment, the electronic apparatus may further include a display device displaying the image of the user divided into the plurality of areas. The input device may receive the selection input based on the image of the user displayed through the display device.

According to an embodiment, the processor may be configured to divide the image of the user into the plurality of areas, the number of which is smaller than the number of areas divided when the intimacy is less than the reference intimacy, when an intimacy with the video call counterpart is not less than a reference intimacy. The display device may display the image of the user divided into the plurality of areas of the smaller number, and the input device may receive the selection input based on the image of the user divided into the plurality of areas of the smaller number displayed through the display device.

According to an embodiment, the electronic apparatus may further include a camera capturing the user to generate the image.

According to an aspect of the present disclosure, a communication method of an electronic apparatus may include dividing a user image into a plurality of areas, displaying the user image divided into the plurality of areas, receiving a selection input to select at least one area among the plurality of areas from a user, editing an area, which is not selected from the user, from among the plurality of areas to generate the edited user image, and transmitting the edited user image to an electronic apparatus of a video call counterpart.

According to an embodiment, the dividing of the user image into the plurality of areas may include dividing the user image into a plurality of areas by using profile information of the video call counterpart.

According to an embodiment, the profile information may include reputation or blocking history.

According to an embodiment, the dividing of the user image into the plurality of areas by using the profile information of the video call counterpart may include dividing the user image into a plurality of areas of the smaller number, as the reputation of the video call counterpart is higher.

According to an embodiment, the editing of the area, which is not selected from the user, from among the plurality of areas to generate the edited user image may include generating the edited user image by displaying the area, which is not selected from the user, from among the plurality of areas with an alternative image or by distorting the area.

According to an embodiment, the editing of the area, which is not selected from the user, from among the plurality of areas to generate the edited user image may include adjusting a degree of distortion of the area, which is not selected from the user, depending on an intimacy with the video call counterpart.

According to an embodiment, the dividing of the user image into the plurality of areas by using the profile information of the video call counterpart may include dividing the user image into a plurality of areas, the number of which is smaller than the number of areas divided when the intimacy is less than the reference intimacy, when an intimacy with the video call counterpart is not less than a reference intimacy.

According to an aspect of the present disclosure, a computer-readable recording medium may record a program for executing, in a computer, the communication method of the electronic apparatus in claim 14.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

In the present disclosure, an 'electronic apparatus' may include not only a cellular phone, a smart phone having a wireless communication function, a personal digital assistant (PDA) having a wireless communication function, a wireless modem, a portable computer having a wired/wireless communication function, a photographing device such as a digital camera having a wired/wireless communication function, a gaming device with a wired/wireless communication function, a music storing and playing appliances with a wired/wireless communication function, an Internet appliance capable of accessing and browsing wired/wireless Internet, but also portable units or terminals incorporating combinations of such functions, but may not be limited thereto.

Figure 1:
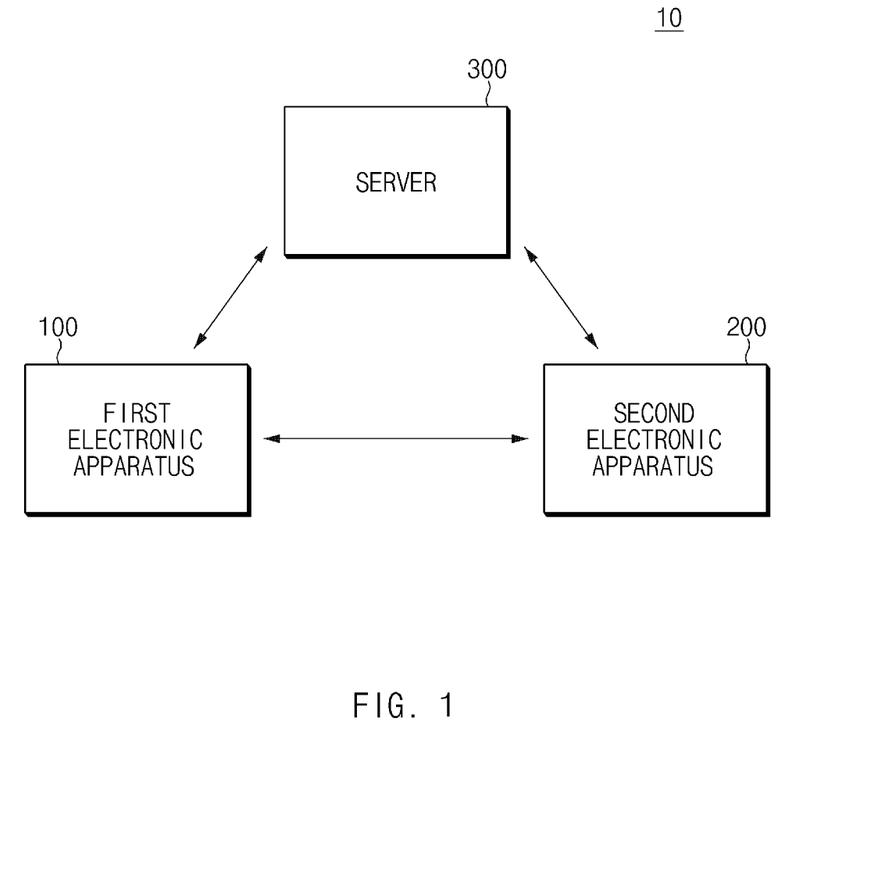
FIG. 1 is a block diagram illustrating a video call system, according to an embodiment of the present disclosure.

FIG. 1 is a block diagram illustrating a video call system, according to an embodiment of the present disclosure.

Referring to FIG. 1, a video call system 10 according to an embodiment of the present disclosure may include a first electronic apparatus 100, a second electronic apparatus 200, and a server 300. The first electronic apparatus 100, the second electronic apparatus 200, and the server 300 may be connected through a wired or wireless communication network.

Each of the first electronic apparatus 100 and the second electronic apparatus 200 may include a video call function. For example, the video call function may be included in each of the first electronic apparatus 100 and the second electronic apparatus 200 in the form of a video call application, and a user may launch the application through the first electronic apparatus 100 or the second electronic apparatus 200 to use the video call function.

For example, the user of the first electronic apparatus 100 may launch the video call application and may make a request for a video call to a user of the second electronic apparatus 200 to the server 300. The server 300 receiving the request may verify the communication state of the second electronic apparatus 200 and may establish a session for a video call between the first electronic apparatus 100 and the second electronic apparatus 200, and thus may make it possible to make a video call between a user of the first electronic apparatus 100 and a user of the second electronic apparatus 200.

In addition, for example, the user of the first electronic apparatus 100 may launch a video call application to make a request for a video call to an arbitrary user, to the server 300. The server 300 receiving the request may search for a counterpart user matched with the user of the first electronic apparatus 100 by using the user information (e.g., profile information, search condition, or the like) of the user of the first electronic apparatus 100.

Furthermore, the server 300 may verify the communication state of the electronic apparatus (e.g., the second electronic apparatus 200) of the found counterpart user and may establish a session for a video call between the first electronic apparatus 100 and the second electronic apparatus 200, and thus may make it possible to make a video call between a user of the first electronic apparatus 100 and a user of the second electronic apparatus 200. That is, the user of the first electronic apparatus 100 may launch the video call application to utilize the random video call service with an arbitrary user.

In the meantime, before transmitting a user image (e.g., an image in which a user is captured) to the second electronic apparatus 200 to start a video call, the first electronic apparatus 100 may properly edit the user image to protect the user's privacy of the first electronic apparatus 100.

Hereinafter, with regard to the first electronic apparatus 100, an electronic apparatus and a communication method thereof according to an embodiment of the present disclosure will be described in detail with reference to FIGS. 2 to 10.

Figure 2:
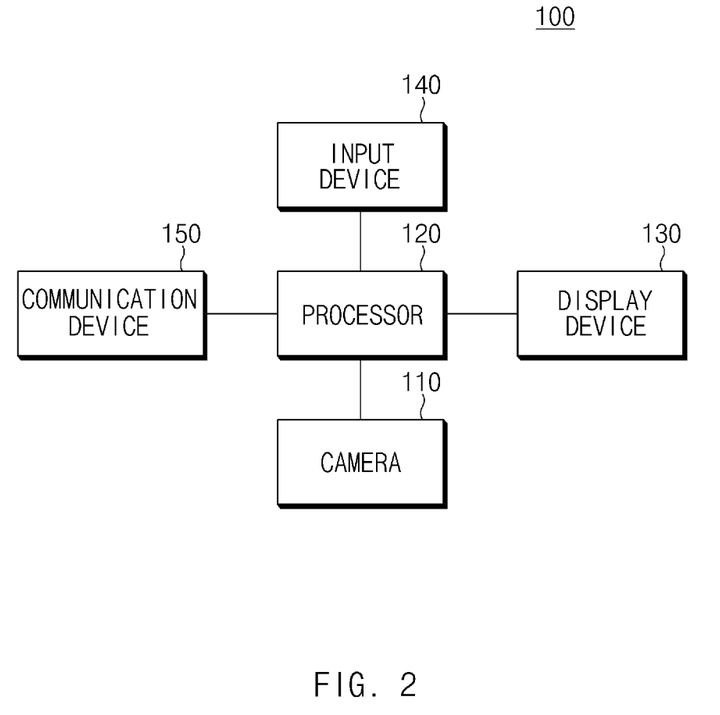
FIG. 2 is a block diagram illustrating an electronic apparatus, according to an embodiment of the present disclosure.

FIG. 2 is a block diagram illustrating an electronic apparatus, according to an embodiment of the present disclosure.

Referring to FIG. 2, the electronic apparatus 100 according to an embodiment of the present disclosure may include a camera 110, a processor 120, a display device 130, an input device 140, and a communication device 150.

The camera 110 may capture a user to generate a user image. For example, the camera 110 may be disposed on the front surface of the electronic apparatus 100 so as to capture the user, but is not limited thereto. For example, it is possible for the camera 110 to be disposed on the rear surface. The generated user image may be displayed through the display device 130 and may be transmitted to an electronic apparatus (e.g., the second electronic apparatus 200, refer to FIG. 1) of another user through the communication device 150. Furthermore, the generated user image may be transmitted to the processor 120.

The processor 120 may control the video call function of the electronic apparatus 100 overall. The processor 120 may include one or more processors. The processor included in the processor 120 may perform an arithmetic operation and/or a logical operation for operating the electronic apparatus 100.

The processor 120 may transmit a request to search for a video call counterpart to the server 300 (refer to FIG. 1) in response to a user's call request input, which is input through the input device 140, and may receive profile information of the found video call counterpart from the server 300. For example, the server 300 may use the profile information of the user of the electronic apparatus 100 or may randomly search for a video call counterpart and may transmit profile information of the found counterpart to the processor 120. Herein, the profile information of the counterpart may include at least one of name, nationality, reputation, a profile image, or a blocking history of the counterpart user. The profile information may not be limited thereto and may include various pieces of information about a counterpart user.

For example, 'reputation' may be defined as the degree of interest from other users in a process in which the counterpart user utilizes a video call application. In more detail, the reputation may be calculated by summing the number of 'likes' and the number of 'recommendations' received from other users while the counterpart makes a video call. The 'blocking history' may be defined as a history of being blocked or reported from other users in the process in which the counterpart user utilizes the video call application.

The processor 120 may divide the user image into a plurality of areas. For example, the processor 120 may divide a user image into a plurality of areas by using the received profile information of a video call counterpart. For example, the plurality of areas may include a face area, a body area (e.g., the whole body area other than a face), and a background area on a user image. However, an embodiment may not be limited thereto. For example, the plurality of areas may also include more detailed areas (e.g., an arm area, a chest area, and the like).

The processor 120 may divide the whole body area and a background area by using a background segmentation technology. For example, the processor 120 may divide the whole body area and the background area by using a graph cut algorithm, a Maximum Similarity-based Region Merging (MSRM) algorithm, or the like.

The processor 120 may divide a face area and a body area in the whole body area by using a face detection technology. For example, the processor 120 may detect a face area from the whole body area by using a technology such as Neural Network, Adaboost, Support Vector Machine, or the like and may divide the detected face area and a body area.

For example, as the reputation of the video call counterpart is higher, the processor 120 may divide a user image into a plurality of areas of the smaller number. Accordingly, the user may control the image exposure range himself/herself by adjusting the number of areas, in each of which an image is to be edited, depending on the reputation of the video call counterpart, and thus the satisfaction of the user's video call may be improved. Furthermore, for example, as the blocking history of video call counterpart is lower, the processor 120 may divide a user image into a plurality of areas of the smaller number. Moreover, the processor 120 may divide a user image into a plurality of areas, the number of which is smaller than the number according to the default setting information of the user, when the nationality of the video call counterpart is the same as the user's nationality of the electronic apparatus 100. The processor 120 may divide a user image into a plurality of images by using the default setting information of the user of the electronic apparatus 100. For example, the default setting information may indicate information set when the user of the electronic apparatus 100 subscribes a video call application service, and may include selection information (e.g., to be set to divide into a face area and a background area) about a predetermined area among a plurality of areas.

The processor 120 may divide a user image into a plurality of images by using an intimacy with a video call counterpart. For example, the processor 120 may divide a user image into a plurality of areas, the number of which is smaller than the number corresponding to the case that the intimacy is less than the reference intimacy, when the intimacy between the user and the video call counterpart is not less than a reference intimacy. Herein, the intimacy may be determined depending on call duration or the amount of conversation between the user of the electronic apparatus 100 and the video call counterpart; for example, the intimacy may be defined as being higher, when the call duration is longer or the amount of conversation is greater.

The processor 120 may edit an area, which is not selected from a user, from among the plurality of areas of the user image and may generate the edited user image. For example, the processor 120 may display an area, which is not selected from the user, from among the plurality of areas with an alternative image or may distort the area, to generate the edited user image. To this end, the processor 120 may display a selection screen through the display device 130 such that the user is capable of selecting at least one area among the plurality of areas.

That is, the user of the electronic apparatus 100 may select an area, which the user wants to expose to the video call counterpart, from among the plurality of areas, and an area, which is not selected by the user is displayed with an alternative image or may be displayed to be distorted, and thus the user's privacy may be protected. Herein, the distortion may mean processing the image so as to look different from the original image by using various methods such as mosaic processing, blurring processing, color adjustment, brightness adjustment, and saturation adjustment.

Meanwhile, the processor 120 may edit an area, which is selected from the user, from among the plurality of areas of the user image to generate the edited user image. In this case, the user may select an area, which the user does not want to expose, from among the plurality of areas through the input device 140.

In addition, the processor 120 may adjust the degree of distortion of the area, which is not selected from the user, depending on the intimacy between the user of the electronic apparatus 100 and the video call counterpart. As the intimacy between the user of the electronic apparatus 100 and the video call counterpart increases, the processor 120 may decrease the degree of distortion of the area, which is not selected from the user. Herein, the distortion may mean the degree processed such that an image looks different from the original image, such as the degree of mosaic processing, the degree of blurring processing, the degree of color adjustment, the degree of brightness adjustment, and the degree of saturation adjustment; for example, mitigating the degree of distortion may mean reducing the degree of distortion such that the distorted image is similar to the original image.

On the other hand, the processor 120 may enhance the degree of distortion of an area, which is not selected by the user, at the time of a next video call to the video call counterpart or may display all or some of the area selected by the user with an alternative image or may display all or some of the area so as to be distorted, when the call duration between the user of the electronic apparatus 100 and the video call counterpart is shorter than a reference call duration or when the amount of conversation is less than the reference amount of conversation. For example, enhancing the degree of distortion may mean increasing the degree of distortion such that the distorted image is different from the original image.

The display device 130 may display a selection screen for selecting at least one area of a user image, an image of the video call counterpart, and a plurality of areas. For example, the selection screen may be displayed while overlapping with the user image. For example, the display device 130 may be, but is not limited to, a liquid-crystal display (LCD), an active-matrix organic light-emitting diode (AM-OLED) panel, or the like. In the meantime, the display device 130 may be provided as a touch screen including a touch panel, and may include the function of the input device 140.

The input device 140 may receive an input from a user. For example, the input device 140 may receive various inputs, from a user, such as a call request input, a selection input to select at least one area among the plurality of areas on the user image, and the like. For example, the input device 140 may include a microphone, a keyboard, a mouse, a trackball, a touch screen, a button, a switch, a sensor, a network interface, various other input devices, or the like. Meanwhile, as described above, the display device 130 may include the function of the input device 140, when the display device 130 is provided as a touch screen; in this case, the call request input may be defined as a touch and drag operation or a swipe operation.

The communication device 150 may communicate with the electronic apparatus (e.g., the second electronic apparatus 200, refer to FIG. 1) of the video call counterpart and/or the server 300. The communication device 150 may communicate with the electronic apparatus (e.g., the second electronic apparatus 200, refer to FIG. 1) of the video call counterpart and/or the server 300, over various wired and/or wireless communication networks. The communication device 150 may transmit the user image and/or the edited user image the electronic apparatus of the video call counterpart and may receive the profile information of the video call counterpart from the server 300 (refer to FIG. 1).

For example, the communication device 150 may include a long range network interface such as a 3G module, an LTE module, an LTE-A module, a Wi-Fi module, a WiGig module, an Ultra-Wide Band (UWB) module, an LAN card, or the like. Also, the communication device 150 may include a short range network interface such as a Magnetic Secure Transmission (MST), a Bluetooth module, an NFC module, an RFID module, a ZigBee module, a Z-Wave module, an infrared module, or the like. Moreover, the communication device 150 may include other network interfaces.

Figure 3:
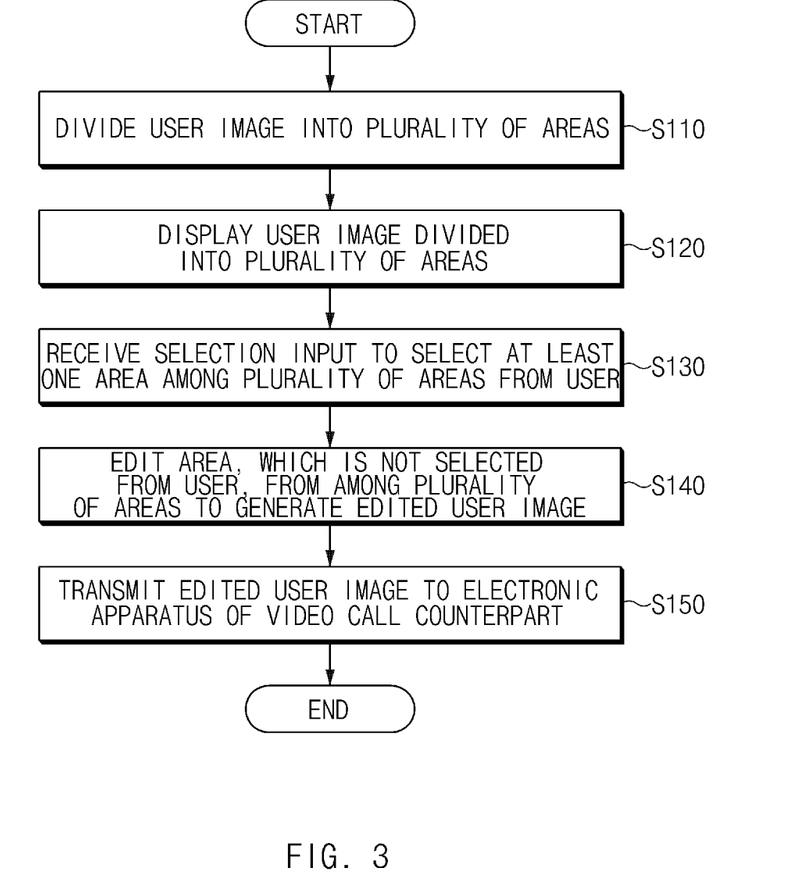
FIG. 3 is a flowchart illustrating a communication method of an electronic apparatus, according to an embodiment of the present disclosure.

FIG. 3 is a flowchart illustrating a communication method of an electronic apparatus, according to an embodiment of the present disclosure. FIGS. 4 to 10 are views for describing a communication method of an electronic apparatus, according to an embodiment of the present disclosure.

Firstly, referring to FIG. 3, a communication method of an electronic apparatus according to an embodiment of the present disclosure may include operation S110 of dividing a user image into a plurality of areas, operation S120 of displaying the user image divided into the plurality of areas, operation S130 of receiving a selection input to select at least one area among the plurality of areas from a user, operation S140 of editing an area, which is not selected from the user, from among the plurality of areas to generate the edited user image, and operation S150 of transmitting the edited user image to an electronic apparatus of a video call counterpart.

Hereinafter, above-described operation S110 to operation S150 will be described in detail with reference to FIGS. 2, and 4 to 10. The details overlapping with those described with reference to FIG. 2 may be appropriately omitted to avoid repetition of the description.

In operation S110, the processor 120 may divide a user image into a plurality of areas. For example, the processor 120 may divide the user image into the plurality of areas by using profile information of a video call counterpart or default setting information of a user of the electronic apparatus 100. For example, the plurality of areas may include a face area, a body area (e.g., the whole body area other than a face), and a background area on a user image. However, an embodiment may not be limited thereto. For example, the plurality of areas may also include more detailed areas (e.g., an arm area, a chest area, and the like).

Figure 4:
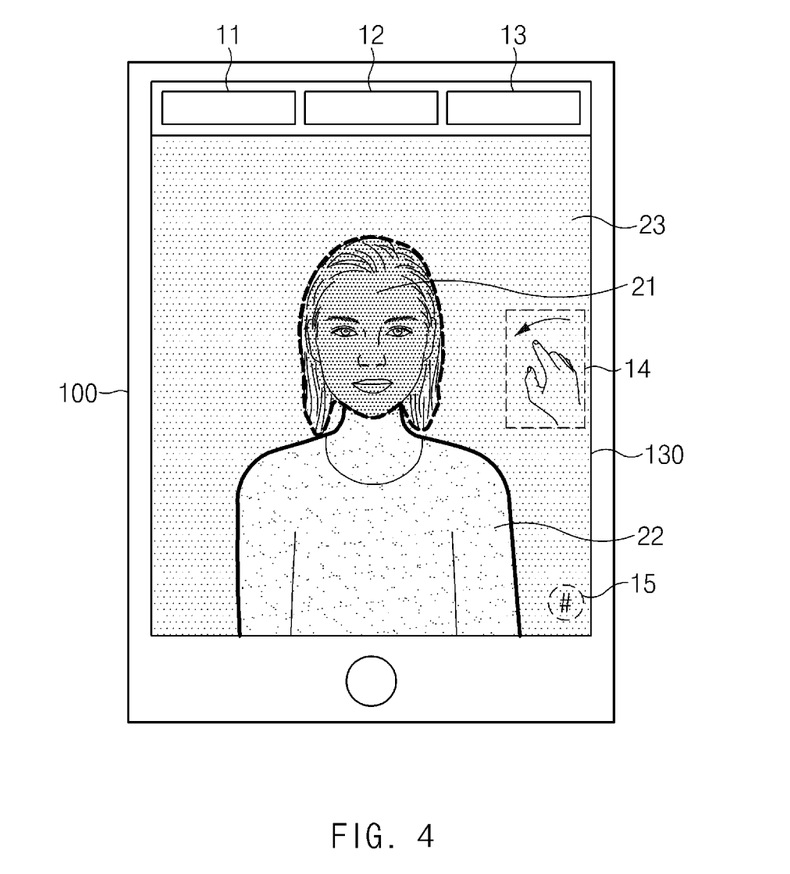
FIGS. 4 to 10 are views for describing a communication method of an electronic apparatus, according to an embodiment of the present disclosure.

Referring to FIG. 4, the execution screen of a video call application is illustrated. Various functions are included in the video call application. For example, the execution screen of the video call application may include a display area 11 corresponding to a function to set the gender of the video call counterpart, a display area 12 corresponding to a function to set a region of the video call counterpart, a display area 13 corresponding to a function associated with a cash usable in the video call application, a display area 14 corresponding to a call request input function, a display area 15 corresponding to a function to set an interest, or the like. The above-described functions may be performed depending on the predetermined algorithm when being selected from a user through the display device 130.

Figure 5:
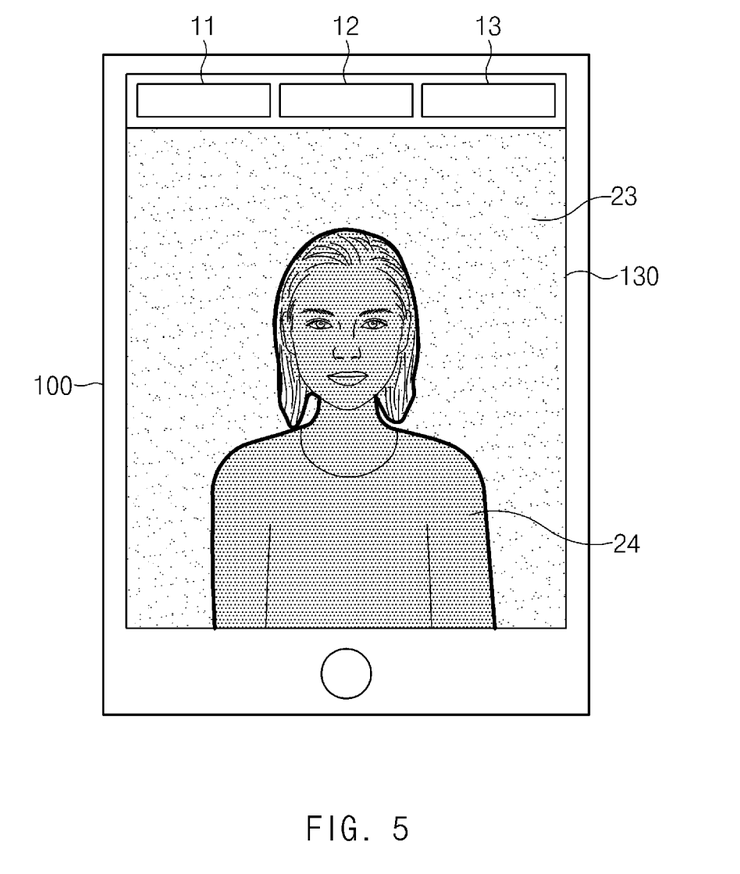

Referring to FIGS. 4 and 5, the processor 120 may divide the user image into a face area 21, a body area 22, and a background area 23 by using the profile information of the video call counterpart (in FIG. 4). In addition, as the reputation of the video call counterpart is higher, the processor 120 may divide the user image into a plurality of areas (a face and body area 24 and the background area 23) of the smaller number, in FIG. 5.

Figure 6:
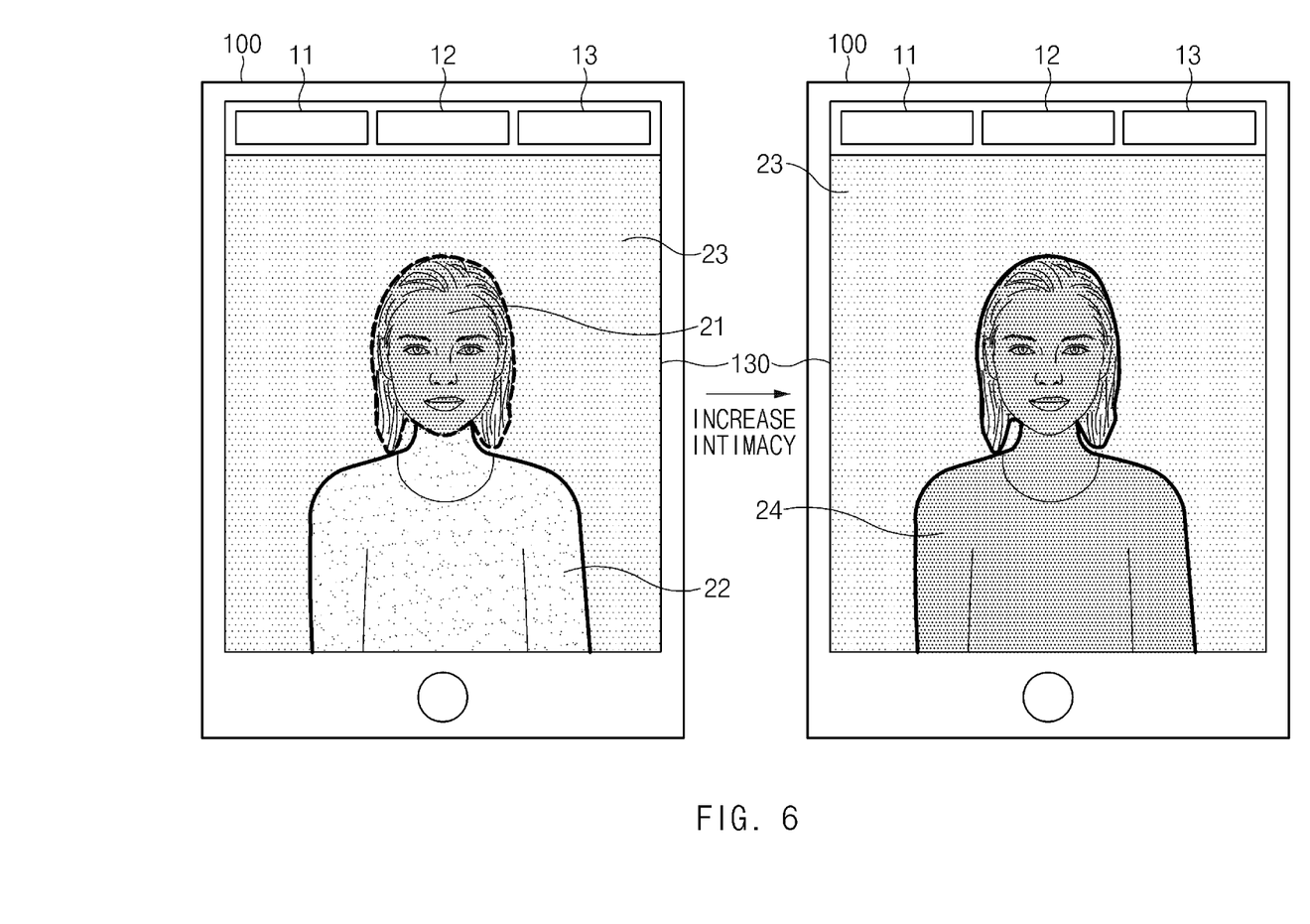

Moreover, referring to FIG. 6, the processor 120 may divide the user image into a plurality of areas (the face and body area 24 and the background area 23), the number of which is smaller than the number of areas (the face area 21, the body area 22, and the background area 23) of the previous image and may display a selection screen for selecting at least one area of the divided plurality of areas through the display device 130, when the intimacy with the video call counterpart is not less than a reference intimacy.

In operation S120, the display device 130 may display the selection screen for selecting at least one area from the user image divided into the plurality of areas. The selection screen may be displayed while overlapping with the user image.

In operation S130, the input device 140 may receive a selection input to select at least one area among the plurality of areas on the user image. For example, the area selected from the user may be displayed to be shaded or marked and may be displayed in, but not limited to, various display methods.

In operation S140, the processor 120 may edit an area, which is not selected from a user, from among the plurality of areas of the user image to generate the edited user image.

Figure 7:
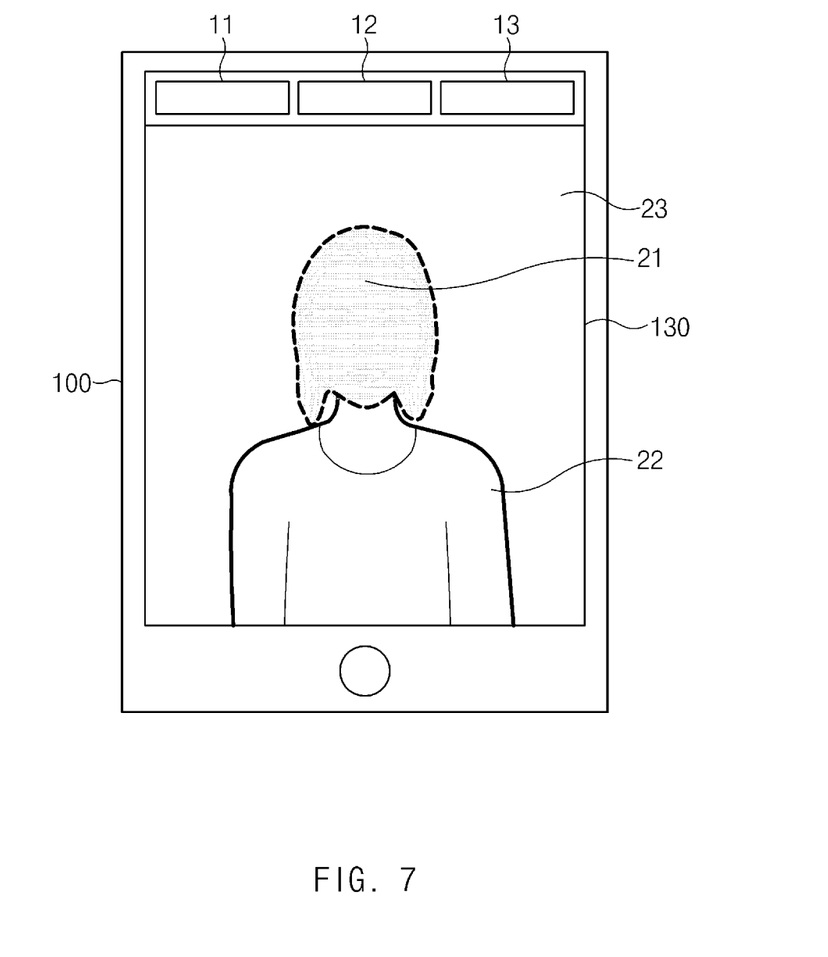
Figure 8:
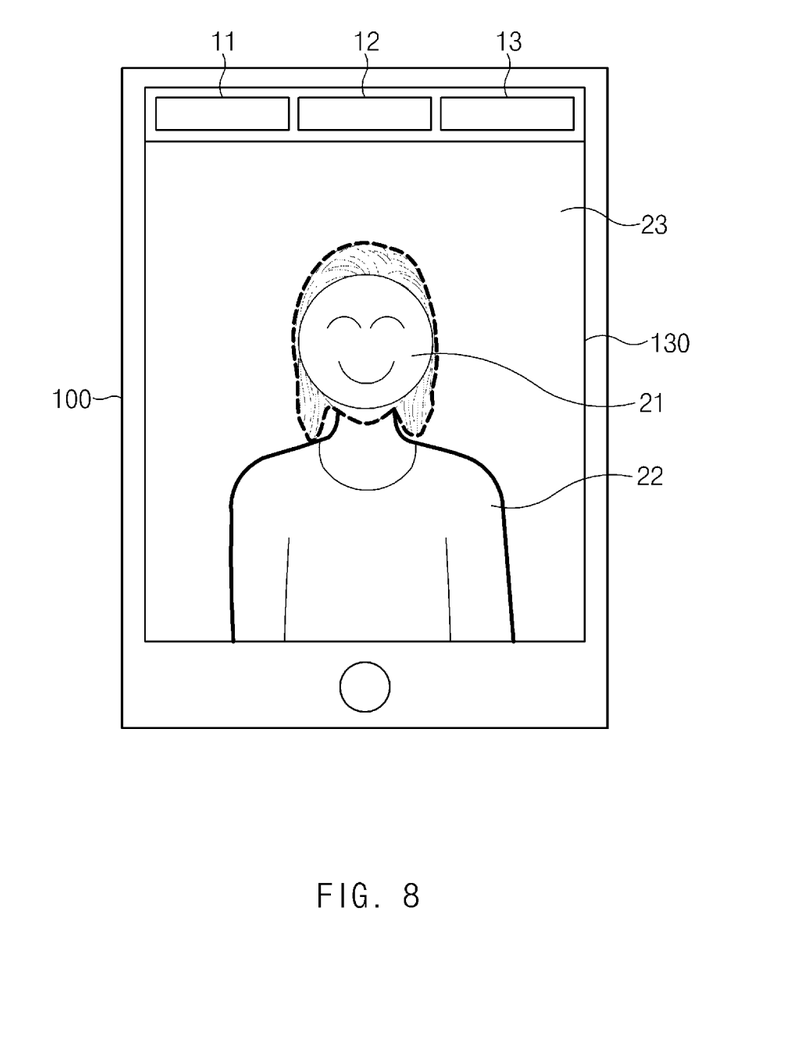

Referring to FIGS. 7 and 8, the case that the body area 22 and the background area 23 are selected from the user among a plurality of areas and the face area 21 is not selected is illustrated.

Referring to FIG. 7, the processor 120 may distort the face area 21 to generate the edited image. Alternatively, referring to FIG. 8, the processor 120 may display the face area 21 with an alternative image to generate the edited user image. That is, the user of the electronic apparatus 100 may select an area, which the user wants to expose to the video call counterpart, from among the plurality of areas, and unselected areas are displayed with an alternative image or may be displayed to be distorted, and thus the user's privacy may be protected.

Figure 9:
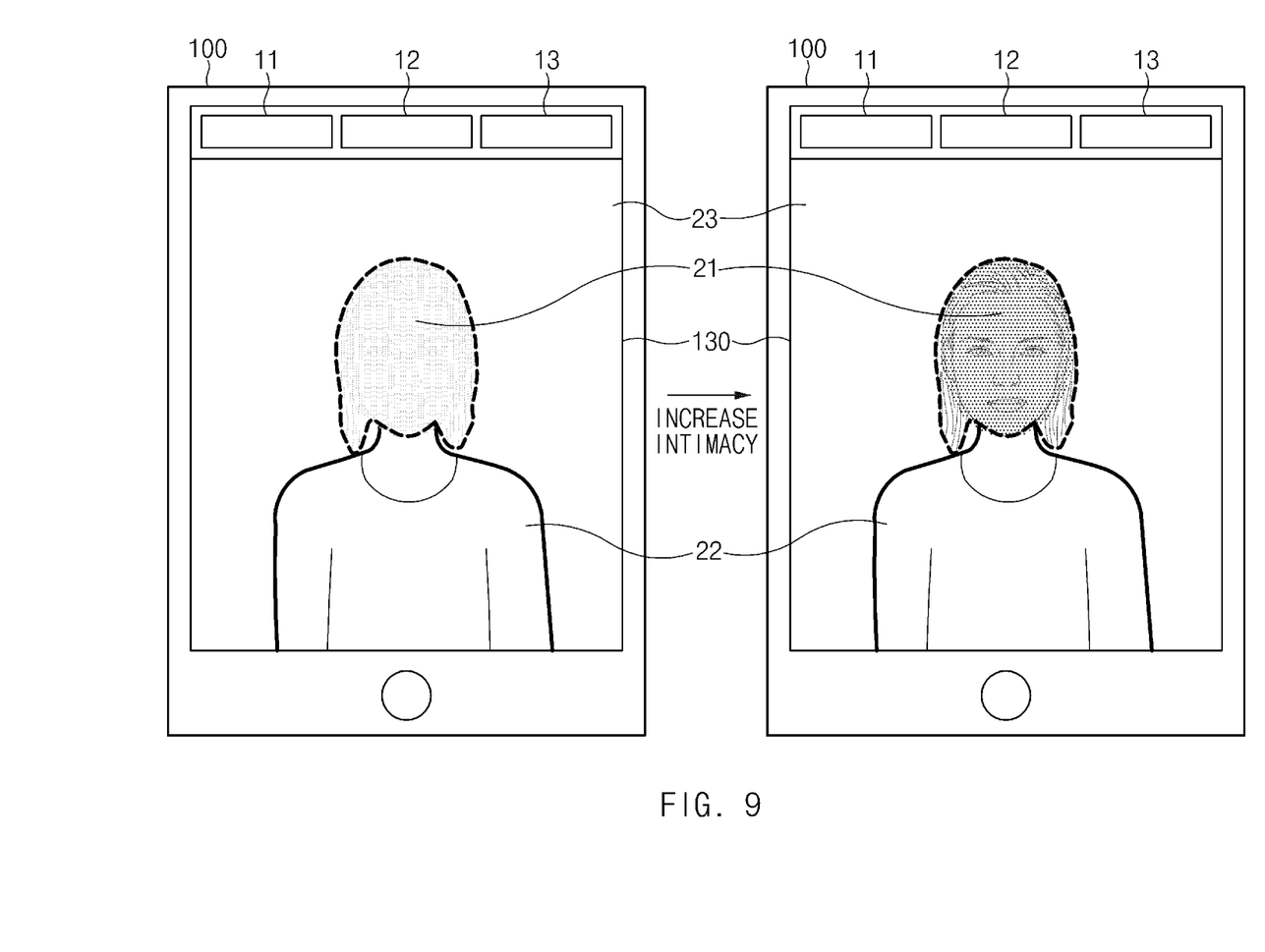

In addition, referring to FIG. 9, the processor 120 may adjust the degree of distortion of the face area 21, which is not selected from the user, depending on the intimacy between the user of the electronic apparatus 100 and the video call counterpart. Herein, the intimacy may be determined depending on call duration or the amount of conversation between the user of the electronic apparatus 100 and the video call counterpart; for example, the intimacy may be defined as being higher, when the call duration is longer or the amount of conversation is greater. As the intimacy between the user of the electronic apparatus 100 and the video call counterpart increases, the processor 120 may decrease the degree of distortion of the face area 21, which is not selected from the user.

In operation S150, the communication device 150 may transmit the edited user image to an electronic apparatus (e.g., the second electronic apparatus 200, refer to FIG. 1) of the video call counterpart.

Figure 10:
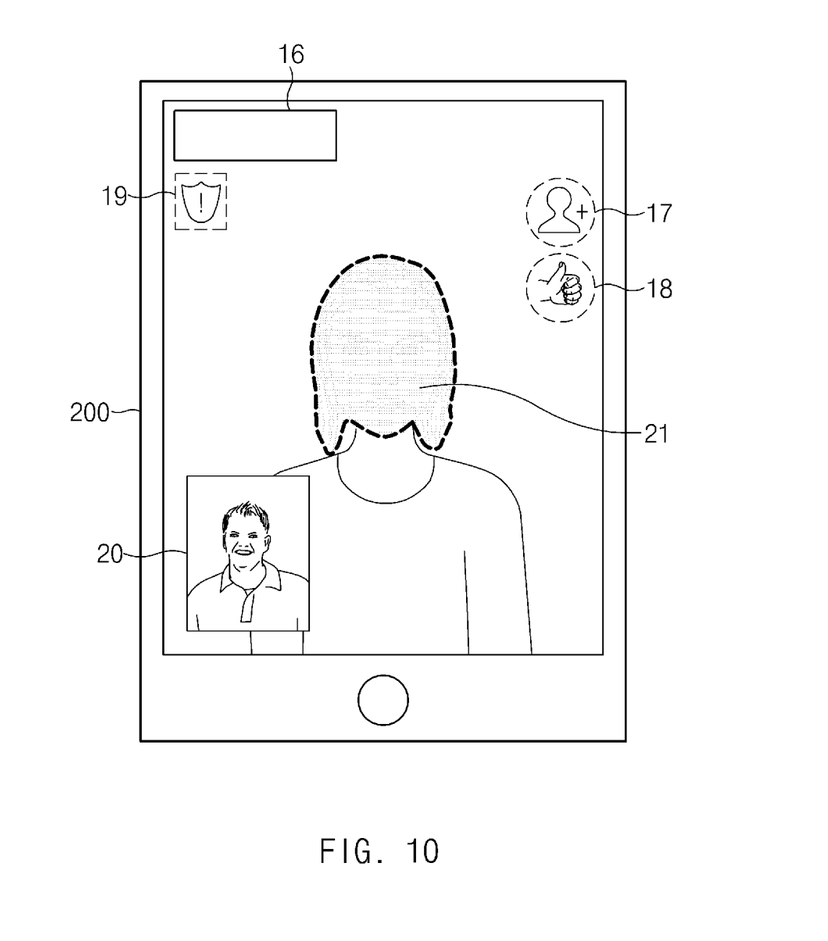

Referring to FIG. 10, the screen displayed in the electronic apparatus 200 of the video call counterpart is displayed. The edited user image of the user of the electronic apparatus 100 may be displayed in the electronic apparatus 200 of the video call counterpart, and the image of the video call counterpart may be also displayed in a predetermined area 20. In addition, the face area 21 of the user of the electronic apparatus 100 may be displayed to be distorted. Accordingly, the privacy of the user of the electronic apparatus 100 may be protected.

In the meantime, profile information 16 may be displayed in the electronic apparatus 200 of the video call counterpart; during a video call, the video call counterpart may select a friend adding function 17 to register the user of the electronic apparatus 100 as a friend, may display reputation to a counterpart through a reputation function 18, or may block the user of the electronic apparatus 100 through a blocking function 19.

Figure 11:
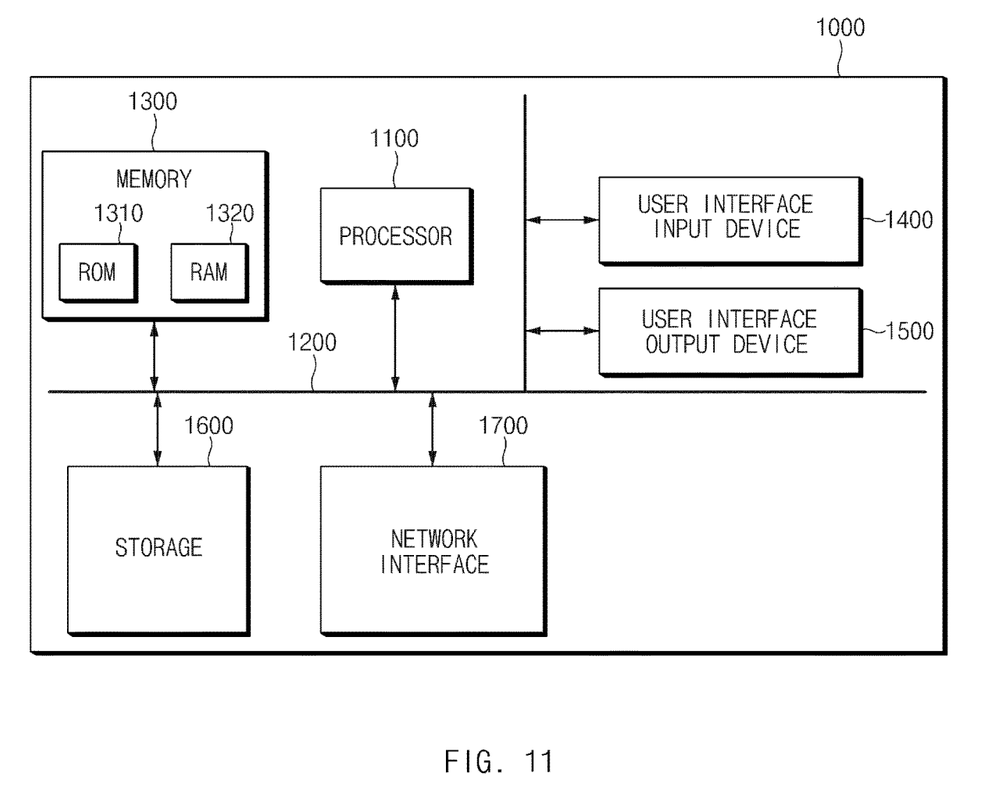
FIG. 11 illustrates a computing system for performing a communication method of an electronic apparatus, according to an embodiment of the present disclosure.

FIG. 11 illustrates a computing system for performing a video call making method of an electronic apparatus, according to an embodiment of the present disclosure.

Referring to FIG. 11, the video call making method of an electronic apparatus according to an embodiment of the present disclosure may be implemented through the computing system. A computing system 1000 may include at least one processor 1100, a memory 1300, a user interface input device 1400, a user interface output device 1500, storage 1600, and a network interface 1700, which are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may reside in a user terminal. Alternatively, the processor and storage medium may be implemented with separate components in the user terminal.

The embodiments described above may also be embodied in the form of a recording medium including instructions executable by a computer, such as a program module executed by a computer. The computer-readable medium may be any available medium capable of being accessed by a computer, and may include all of a volatile medium, a nonvolatile medium, a removable medium, and a non-removable medium.

In addition, the computer-readable medium may also include a computer storage medium or a communication medium. The computer-readable medium may include all of a volatile medium, a nonvolatile medium, a removable medium, and a non-removable medium, which are implemented by using a method or technology for storing information such as a computer-readable instruction, a data structure, a program module, or other data. The communication medium typically includes a computer-readable instruction, a data structure, a program module, other data of the modulated data signal such as a carrier wave, or other transmission mechanisms, and may include any information delivery medium.

Although embodiments of the present disclosure have been described herein with reference to accompanying drawings, it should be understood by those skilled in the art that the present disclosure may be embodied in other specific forms without departing from the spirit or essential characteristics thereof. Therefore, it should be understood that the above embodiments are not limiting, but illustrative.

According to an embodiment of the present disclosure, an electronic apparatus and a communication method thereof may perform a video call function with the enhanced function to protect a user's privacy.

According to an embodiment of the present disclosure, an electronic apparatus and a communication method may perform a video call function with the improved convenience of the user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An electronic apparatus making a video call comprising:
  a processor configured to divide an image of a user of the electronic apparatus into a plurality of areas;
  an input device configured to receive a selection input to select at least one area among the plurality of areas from the user;
  wherein the processor is further configured to edit an area of the plurality of areas other than the at least one area to generate an edited image; and
  a communication device configured to transmit the edited image to an electronic apparatus of a video call counterpart, the edited image including the selected at least one area and the edited area.

2. The electronic apparatus of claim 1, wherein the processor is configured to:
  divide the image of the user of the electronic apparatus into a plurality of areas by using profile information of the video call counterpart.

3. The electronic apparatus of claim 2, wherein the profile information includes reputation or blocking history of the video call counterpart.

4. The electronic apparatus of claim 3,
  wherein the processor is configured to:
  divide the image of the user into a number of areas, wherein the number of areas is based on the reputation of the video call counterpart such that as the reputation of the video call counterpart increases, the number of areas decreases.

5. The electronic apparatus of claim 1, wherein the processor is configured to:
  divide the image of the user into a plurality of areas by using default setting information of the user.

6. The electronic apparatus of claim 5, wherein the default setting information of the user includes selection input information about a predetermined area among the plurality of areas.

7. The electronic apparatus of claim 1, wherein the plurality of areas includes a face area, a body area, and a background area.

8. The electronic apparatus of claim 7, wherein the processor is configured to:
  generate the edited image by displaying an area, other than the at least one area selected by the user, from among the plurality of areas with an alternative image or by distorting the area.

9. The electronic apparatus of claim 8, wherein the processor is configured to:
  adjust a degree of distortion of the area, other than the at least one area selected by the user, depending on an intimacy score with the video call counterpart.

10. The electronic apparatus of claim 9, wherein the intimacy score is based at least in part on the call duration and increases as the call duration with the video call counterpart is longer or the amount of conversation is greater, and
  wherein the processor decreases the degree of distortion of the area, other than the at least one area selected by the user, as the intimacy score increases.

11. The electronic apparatus of claim 1, further comprising:
  a display device configured to display the image of the user divided into the plurality of areas,
  wherein the input device receives the selection input based on the image of the user displayed through the display device.

12. The electronic apparatus of claim 11, wherein the processor is configured to:
  when an intimacy score with the video call counterpart is not less than a intimacy score threshold,
  divide the image of the user into the plurality of areas, the number of which is smaller than the number of areas divided when the intimacy score is less than the intimacy score threshold,
  wherein the display device displays the image of the user divided into the plurality of areas of the smaller number, and
  wherein the input device receives the selection input based on the image of the user divided into the plurality of areas of the smaller number displayed through the display device.

13. The electronic apparatus of claim 1, further comprising:
  a camera configured to capture the user to generate the image.

14. A communication method of an electronic apparatus, the method comprising:
  dividing a user image into a plurality of areas;
  displaying the user image divided into the plurality of areas;
  receiving a selection input to select at least one area among the plurality of areas from a user;
  editing an area of the plurality of areas other than the at least one area to generate an edited user image; and
  as part of a video call between the electronic apparatus and a video call counterpart electronic apparatus, transmitting the edited user image to the video call counterpart electronic apparatus of a video call counterpart, the edited image including the selected at least one area and the edited area.

15. The method of claim 14, wherein the dividing of the user image into the plurality of areas includes:
  dividing the user image into a plurality of areas by using profile information of the video call counterpart.

16. The method of claim 15, wherein the profile information of the video call counterpart includes a reputation or blocking history.

17. The method of claim 16, wherein to divide the image of the user into the plurality of areas by using the profile information of the video call counterpart includes to:

divide the image of the user into a number of areas, wherein the number of areas is based on the reputation of the video call counterpart such that as the reputation of the video call counterpart increases, the number of areas decreases.

18. The method of claim 15, wherein the editing of the area, other than the at least one area selected by the user, from among the plurality of areas to generate the edited user image includes:

generating the edited user image by displaying the area, other than the at least one area selected by the user, from among the plurality of areas with an alternative image or by distorting the area.

19. The method of claim 18, wherein the editing of the area, other than the at least one area selected by the user, from among the plurality of areas to generate the edited user image includes:

adjusting a degree of distortion of the area, other than the at least one area selected by the user, depending on an intimacy score with the video call counterpart.

20. The method of claim 15, wherein the dividing of the user image into the plurality of areas by using the profile information of the video call counterpart includes:

when an intimacy score with the video call counterpart is not less than an intimacy score threshold, dividing the user image into a plurality of areas, the number of which is smaller than the number of areas divided when the intimacy score is less than the intimacy score threshold.

\* \* \* \* \*